United States Patent [19]

Snetting et al.

[11] Patent Number: 4,550,919
[45] Date of Patent: Nov. 5, 1985

[54] SEAL FOR A POWER FED ROLLER

[75] Inventors: Mark Snetting, Eden Prairie; Dan West, Crystal; John R. Hacker, Burnsville, all of Minn.

[73] Assignee: Wagner Spray Tech Corporation, Minneapolis, Minn.

[21] Appl. No.: 650,898

[22] Filed: Sep. 14, 1984

[51] Int. Cl.[4] .............................................. F16J 15/34
[52] U.S. Cl. ................................... 277/23; 277/81 R
[58] Field of Search ......................... 277/23, 24, 81 R

[56] References Cited

U.S. PATENT DOCUMENTS

| Re. 29,311 | 7/1977 | Ritter . | |
|---|---|---|---|
| 2,391,577 | 12/1945 | Larson | 277/23 |
| 2,799,215 | 4/1940 | Abercrombie | 277/23 |
| 2,955,310 | 10/1960 | Wichern . | |
| 3,145,411 | 8/1964 | Fischer et al. . | |
| 3,193,868 | 7/1965 | Cassidy . | |
| 3,549,267 | 12/1970 | Wurzer et al. . | |
| 3,554,659 | 1/1971 | Stokes . | |
| 3,809,484 | 5/1974 | Bradshaw . | |
| 3,826,581 | 7/1974 | Henderson . | |
| 3,933,415 | 1/1976 | Woolpert . | |

4,217,062  8/1980  Trp et al. .

Primary Examiner—Robert I. Smith
Attorney, Agent, or Firm—Hill, Van Santen, Steadman & Simpson

[57] ABSTRACT

A seal disposed in the interior of a roller which is used in a system wherein paint is supplied under pressure to the interior of the roller consists of porous resilient filter material which simultaneously performs the function of sealing the exterior opening which must be present to permit rotation and assembly of the roller parts, filtering pigment from the paint so that if any leakage does occur only non-pigment containing liquid will exit, and permitting relative rotation of rotatable parts of the roller with respect to stationary parts of the roller while maintaining the seal. The seal is in the form of a grommet or elongated washer which completely surrounds a shaft support carried on a rotatable part of the roller to which the paint-applying knap is affixed, the support in turn receiving a shaft of a stationary part of the roller to which paint is supplied under pressure in the interior of the roller.

11 Claims, 3 Drawing Figures

U.S. Patent  Nov. 5, 1985  4,550,919
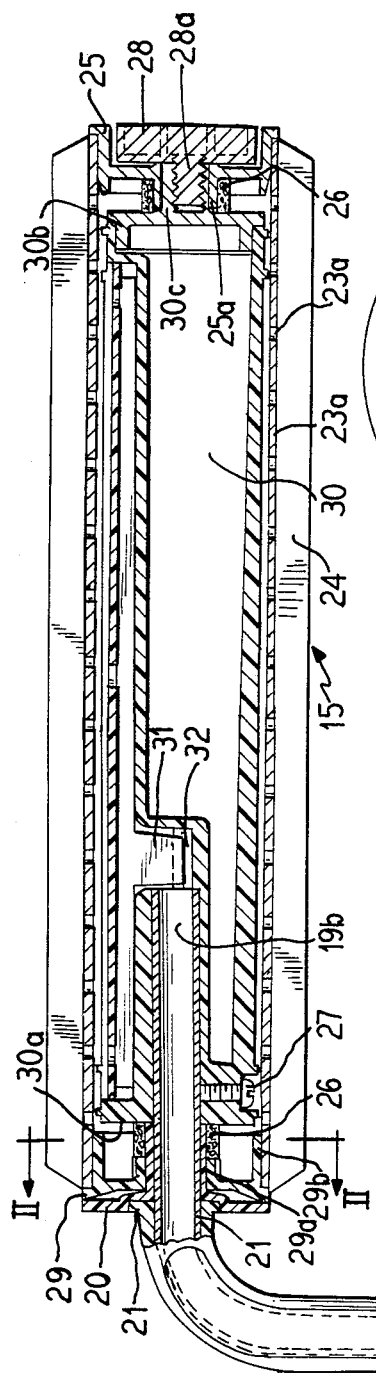
FIG. 1
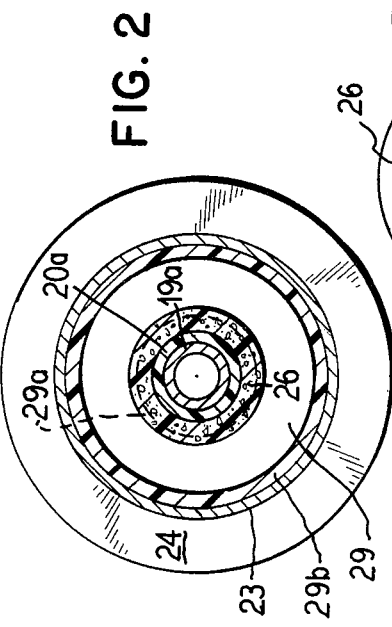
FIG. 2
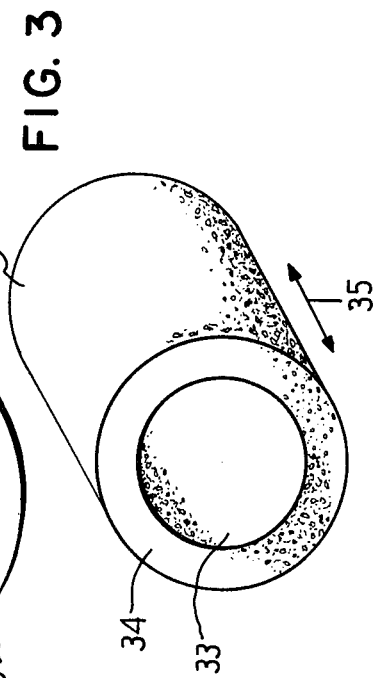
FIG. 3
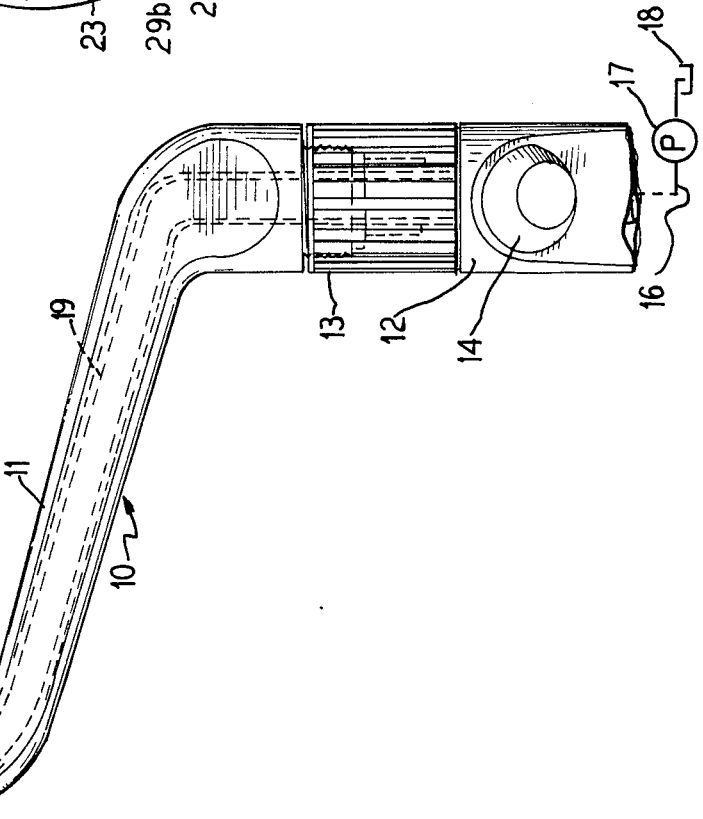

SEAL FOR A POWER FED ROLLER

BACKGROUND OF THE INVENTION

1. Field of the Invention

The present invention relates to paint-applying rollers to which paint is supplied under pressure, and in particular to a seal for such a roller.

2. Description of the Prior Art and Related Application

Various types of paint-applying rollers are known in the art wherein the paint is supplied under pressure to an interior of the knap-carrying roller, and is forced through interior apertures of the roller so as to saturate the knap permitting a user to continuously apply paint to a surface. Such power fed rollers are described, for example, in U.S. Pat. Nos. RE29311; 2,955,310; 3,145,411; 3,193,368; 3,549,267; 3,554,659; 3,809,484; 3,826,581; and 4,217,062.

All of the above rollers exhibit the problem of leakage of the paint or other fluid supplied under pressure to the interior of the knap-carrying tube which is used to apply the paint to a surface. The knap-carrying tube must necessarily rotate with respect to a stationary interior part to which the paint or other fluid is supplied under pressure. A means permitting flow of the paint or other liquid through the knap-carrying tube must also be present, that is, the knap-carrying tube and the stationary element to which the paint is suplied must be in fluid communication. In order to permit application of paint or other liquid along the entire length of the knap of the roller, the tube or roller is rotatably supported at the ends thereof in the above devices. A problem in this technology resides in the design of a means permitting rotation of the roller with respect to the interior paint supply means which does not permit leakage of paint or other liquid out of the ends of the roller.

A paint roller assembly is disclosed in the co-pending application of Rudolf R. Karliner and Gerald E. Peterson, Ser. No. 602,206 filed on Apr. 19, 1984, and assigned to the assignee of the present application, Wagner Spray Tech Corporation. That assembly includes a hollow roller arm, a delivery tube within the roller arm which receives pressurized liquid, such as paint, the tube terminating in a horizontally disposed end portion. The end portion is received in a roller core and also functions as a shaft about which a perforated knap-carrying tube rotates. The roller core has an opposite end face having another shaft extending therefrom. The knap-carrying tube has end caps each having an interiorly extending tube for respectively receiving the shafts of the roller core. Engagement of the shafts within the end cap tubes permits rotation of the knap-carrying tube with respect to the roller core.

SUMMARY OF THE INVENTION

It is an object of the present invention to provide a seal for a power fed roller which permits relative rotation of roller parts while substantially preventing liquid leakage at the surfaces of engagement of the relatively rotatable parts.

A further object of the present invention is to provide a seal as described above which simultaneously filters the liquid supplied to the roller such that if any leakage does occur, only non-pigment containing liquid will exit to the exterior of the device.

A further object of the present invention is to provide such a seal which abuts a stationary part of the roller and a rotatable part of the roller and permits relative movement of the rotatable part with respect to the stationary part without undue friction.

The above objects are inventively achieved in a seal in the form of a grommet or elongated washer comprised of resilient porous material. The porosity of the material permits the seal to simultaneously function as a filter for filtering the pigment or other particulate matter from the liquid supplied to the interior of the roller, such that if any liquid does leak or otherwise exit from the foller, the exiting liquid will be non-pigment containing, such as water or thinner.

The resiliency of the seal permits the seal to be placed in abutment with both a rotatable part and a stationary part of the roller, while permitting relative movement of the rotatable part without undue friction.

The seal may be axially compressable so as to be easily assembled.

The seal may be incorporated in the roller disclosed in the aforementioned copending application Ser. No. 602,206 by being received on the shaft supporting tube of the end cap of the roller, the shaft carried on the end face of the roller core being received in the shaft support such taht the seal abuts and moves against the end face of the roller core.

DESCRIPTION OF THE DRAWINGS

FIG. 1 is a side view in section of a power fed roller embodying a seal constructed in accordance with the principles of the present invention.

FIG. 2 is a sectional view of the power fed roller of FIG. 1 taken along line II—II.

FIG. 3 is an enlarged perspective view of the seal used in the roller shown in FIG. 1 constructed in accordance with the principles of the present invention.

DESCRIPTION OF THE PREFERRED EMBODIMENTS

A power fed paint roller assembly embodying a seal constructed in accordance with the principles of the present invention is generally referenced at 10 in FIG. 1. The assembly includes a hollow roller arm 11 connected to a handle 12 (only a portion of which is shown in FIG. 1) by a cinch knob 13. The handle 12 has a push button operated valve assembly 14 permitting a user to control the flow of liquid, such as paint, into the roller arm 11 and ultimately to a roller cover 15. The paint or other liquid is supplied through a flexible conduit 16 from a pump 17 which receives the liquid from a reservoir schematically represented and referenced at 18.

The hollow roller arm 11 has an interior delivery tube 19 therein through which the liquid is supplied to the roller cover 15. The roller arm 11 terminates in a circular flange 20 received on keys 21 preventing rotation of the flange 20 with respect to the roller arm 11.

The delivery tube 19 has a free end 19a, such as a metal tube, which extends into a roller core 30. The roller core 30 has a groove 31 along a major portion of its length which extends into a sump 32 communicating with the free end 19a of the delivery tube. The roller core 30 is received within a perforated roller tube 23 which is part of the roller 15. The roller tube 23 has a plurality of apertures 23a therein, and is surrounded by knap 24. Paint or other liquid is supplied from the reservoir 18 through the pump 17, the conduit 16, the delivery tube 19, and the free end 19a and is evenly distributed by the action of the sump 32 and the groove 31 along the length of the roller core 30. The liquid is thus supplied through the apertures 23a to the knap 24 for application to a surface.

The roller core 30 is axially fixed with respect to the free end 19a by any suitable means, such as a set screw 27. Once the set screw 27 is tightened, the roller core 30 becomes a stationary element with the roller arm 11 about which the roller 15 rotates, as described in detail below.

The roller tube 23 has end caps 25 and 29 respectively disposed at opposite ends thereof and received inside the roller tube 23. The end cap 29 has a first interiorly extending tube 29a which is concentric with and surrounds an interiorly extending tube 20a of the flange 20. The end cap 29 also has a second interiorly extending tube 29b which is received in the roller tube 30. At the other end, the end cap 25 has an interiorly extending tube 25a which is concentric with and surrounds an outwardly extending tube 30c carried on an end face 30b of the roller core 30. The interior of the outwardly extending tube 30c is threaded for receiving a threaded portion 28a of a locking member 28.

As shown in the drawing, the end face 30b of the roller core 30 may be a separate part inserted in the roller core 30, while the opposite end face 30a of the roller core 30 may be integral with the roller core 30.

A porous resilient annular seal 26 is disposed at each end of the roller 15 between the respective end faces of the roller core 30 and the respective end caps of the roller tube 23. A seal 26 is disposed, as shown in FIG. 1, at the left side of the roller 15 between the end face 30a and the end cap 29, and at the right side of the roller 15 between the end face 30b and the end cap 25. The roller tube 23 rotates about shafts which are formed by the outwardly extending tube 30c and the inwardly receiving tube 20a, these being respectively received in the inwardly extending tubes of the end caps 29 and 25 (those inwardly extending tubes being 29a and 25a). The seals 26 permit such rotation to occur substantially friction-free, while substantially preventing flow of liquid through the small space between the engaging surfaces of the outwardly extending tube 30c and the inwardly extending tube 25a, and the inwardly extending tubes 20a and 29a. The resiliency of the seals 26, particularly in the axial direction, permits the seals 26 to be slightly compressed to insure a tight fit for sealing purposes without substantially adding to friction during rotation of the parts.

The relationship of the seal 26 to the surrounding parts is shown in FIG. 2 in a sectional view, and the details of the seals 26 are shown in enlarged view in FIG. 3. Each seal 26 is in the form of a cylinder having a circular opening 33 extending through a longitudinal axis thereof, so as to form annular end faces 34, one of which can be seen in FIG. 3. The seals 26 are axially compressable, at least along the longitudinal axis thereof, as indicated by the arrow 35.

The seals 26 may consist of cellular urethane such as PORON® which is commercially available from the Rogers Corporation, specifically PORON®4701. Cellular urethane, in addition to being sufficiently compressable to form a satisfactory seal, also functions as a filter. As used in the assembly 10 shown in FIG. 1, the seals 26 thus perform the simultaneous and additional function of filtering any liquid which may leak through the seals 26, so that if any liquid does exit the ends of the roller 15, the liquid will be substantially pigment-free, and will as a result not be particularly bothersome. The seal 26 thus functions as a combination sealing means, filtering means, and compressable bearing means.

Although modifications and changes may be suggested by those skilled in the art it is the intention of the inventors to embody within the patent warranted hereon all changes and modifications as reasonably and properly come within the scope of their contribution to the art.

We claim as our invention:

1. A seal for use with a rotatable part and a stationary part engaged therewith defining a volume therebetween filled with pigment-containing fluid, said rotatable part having an opening, said seal being disposed between said parts and adjacent said opening and consisting of resilient porous material having a selected porosity for simultaneously filtering said fluid by preventing passage of said pigment through said seal, substantially preventing leakage of unfiltered fluid through said opening, and having a selected resiliency and surface friction for permitting substantially unimpeded rotation of said rotatable part relative to said stationary part.

2. A seal as claimed in claim 1 wherein said rotatable part and said stationary part each have respective tubes extending therefrom, said tubes being in concentric engagement and said seal surrounding said tubes.

3. A seal as claim in claim 1 wherein said seal has an axis extending between said parts, and wherein said seal is compressable at least along said axis.

4. A seal as claimed in claim 1 wherein said seal consists of cellular urethane.

5. A seal for two relatively movable parts defining a volume therebetween containing pigment-containing fluid, one of said parts having an opening, said seal disposed adjacent said opening between and in contact with said parts and having a selected porosity and resiliency for simultaneously filtering said fluid by preventing passage of pigment through said seal and sealing said opening and having surface friction selected for permitting substantially unimpeded movement of said parts.

6. A seal as claimed in claim 5 wherein said seal consists of cellular urethane.

7. A seal as claimed in claim 5 wherein said seal has an axis extending between said relatively movable parts, and wherein said seal is compressable at least along said axis.

8. In a power fed roller assembly having a stationary element to which pigment-containing liquid is supplied under pressure and a rotatable roller surrounding said stationary element, said stationary element and said roller each having bearing means, said bearing means being engaged for permitting rotation of said roller about said stationary element, the improvement of a seal consisting of resilient porous material disposed between said stationary element and said roller and surrounding said bearing means having a selected porosity and resiliency for simultaneously sealing said bearing means and filtering said liquid and having selected surface friction for permitting substantially unimpeded relative movement of said stationary element and said roller.

9. The improvement of claim 8 wherein said bearing means are respective concentric tubes extending from said stationary element and said roller, and wherein said seal is a cylinder having a central opening therein receiving said tubes.

10. The improvement of claim 8 wherein said seal is compressable along a longitudinal axis of said tubes.

11. The improvement of claim 8 wherein said seal consists of cellular urethane.

* * * * *